United States Patent
Lange et al.

[19]

[11] Patent Number: 6,151,670
[45] Date of Patent: Nov. 21, 2000

[54] METHOD FOR CONSERVING MEMORY STORAGE USING A POOL OF SHORT TERM MEMORY REGISTERS

[75] Inventors: Eric W Lange, Campbell; Stephen Hoge, Santa Cruz, both of Calif.

[73] Assignee: Creative Technology Ltd., Singapore

[21] Appl. No.: 09/191,752

[22] Filed: Nov. 13, 1998

Related U.S. Application Data

[63] Continuation of application No. 08/886,920, Jul. 2, 1997, Pat. No. 5,930,158.

[51] Int. Cl.[7] .................................................. G06F 15/00
[52] U.S. Cl. .......................... 712/228; 712/225; 712/231; 711/141
[58] Field of Search ................................. 712/228, 220, 712/231, 225, 201, 202, 232; 711/141

[56] References Cited

U.S. PATENT DOCUMENTS

| | | | |
|---|---|---|---|
| 4,811,208 | 3/1989 | Myers et al. | 711/132 |
| 5,890,009 | 3/1999 | Luick et al. | 712/24 |

FOREIGN PATENT DOCUMENTS

| | | | |
|---|---|---|---|
| 2-18622 | 1/1990 | Japan | G06F 9/38 |

*Primary Examiner*—Meng-Ai T. An
*Assistant Examiner*—Mackly Monestime
*Attorney, Agent, or Firm*—Townsend and Townsend and Crew LLP

[57] ABSTRACT

A method for conserving processor registers during the execution of a program in which short term data having a short processing period and long term data having a long processing period are processed. The method includes the acts of: providing a program having a first address space for addressing the short term data and a second address space for addressing the long term data, defining within the processor a first plurality of pooled registers for storing the short term data, executing said program, allocating, responsive to the program, at least one of the pooled registers to the first address space, controlling, via said program, the allocated pool register for the duration of said short processing period, and terminating program control of the allocated pool register upon the expiration of said short processing period.

17 Claims, 2 Drawing Sheets

METHOD FOR CONSERVING MEMORY STORAGE USING A POOL OF SHORT TERM MEMORY REGISTERS

CROSS-REFERENCES TO RELATED APPLICATIONS

The commonly owned, co-pending patent application entitled: "Processor with Instruction Set for Audio Effects," is a continuation of Ser. No. 08/886,920, filed Jul. 2, 1997, now U.S. Pat. No. 5,930,158 is herein incorporated by reference.

BACKGROUND OF THE INVENTION

This invention relates generally to a method for conserving memory space during processor operations, and more specifically to a method for conserving memory storage in an audio signal processor using a pool of short term memory registers.

Typically, processors use memory registers to store data and program instructions. Upon receiving a command to execute a particular program, instructions needed to execute the program's steps are retrieved from memory. Stored data which is to be processed is retrieved from memory. Once processed, the data may be stored in available memory registers for subsequent processing or output.

During conventional processing, the executing program takes control of those registers which supply or store data in response to the program's instructions. Control of the registers typically lasts for the duration of the program to ensure proper program execution. Program control of these registers and is necessary since, in many cases, the previously processed data is required in some subsequent steps.

Unfortunately, the consequence of program control over the memory registers is their removal from the processor's available memory. As can be imagined, the execution of a large program which processes a large amount of data or the concurrently execution of a number of smaller programs could very easily result in a shortage of memory and abrupt program termination.

It is known, however, that not all processed data have the same "lifetimes," i.e. the periods over which the data is required for program execution. For example, in a processor which executes X program instructions for each sample period, some processor operations will require data over multiple sample periods, while other operations will complete data processing within one sample period. In the latter instance, the allocation of short term data to a memory register for a period longer than one sample period is inefficient since the program only requires the data for a very short period of time.

What is therefore needed is a method for conserving memory registers during program execution which avoids inefficiently allocating memory registers to data which is only temporarily required.

SUMMARY OF THE INVENTION

The present invention provides a method for conserving memory storage during program execution based upon the data's lifetime using a pool of memory registers. In one embodiment, a program is provided having a first address space for addressing short term data required over a short processing period and a second address space for addressing long term data required over a long processing period. Next, a pool of registers is defined within the processor for storing the short term data. The program is subsequently executed and, responsive to the program, zero or more of the pooled registers are allocated to the program's address space for processing short-term data. These pooled registers may be allocated to the same or different programs during different sample periods occurring therein. As long as the registers are used by the programs according to the agreed definition of short-term (in the preferred embodiment, usage is limited to the processing performed in one sample period), these registers can be shared for as long as the programs are executing. In this manner, long term memory registers are reserved for long term data and the processor's total memory resources are more efficiently utilized.

The invention will be better understood when considered in light of the foregoing drawings and detailed description.

DESCRIPTION OF THE SPECIFIC EMBODIMENTS

Figure 1:
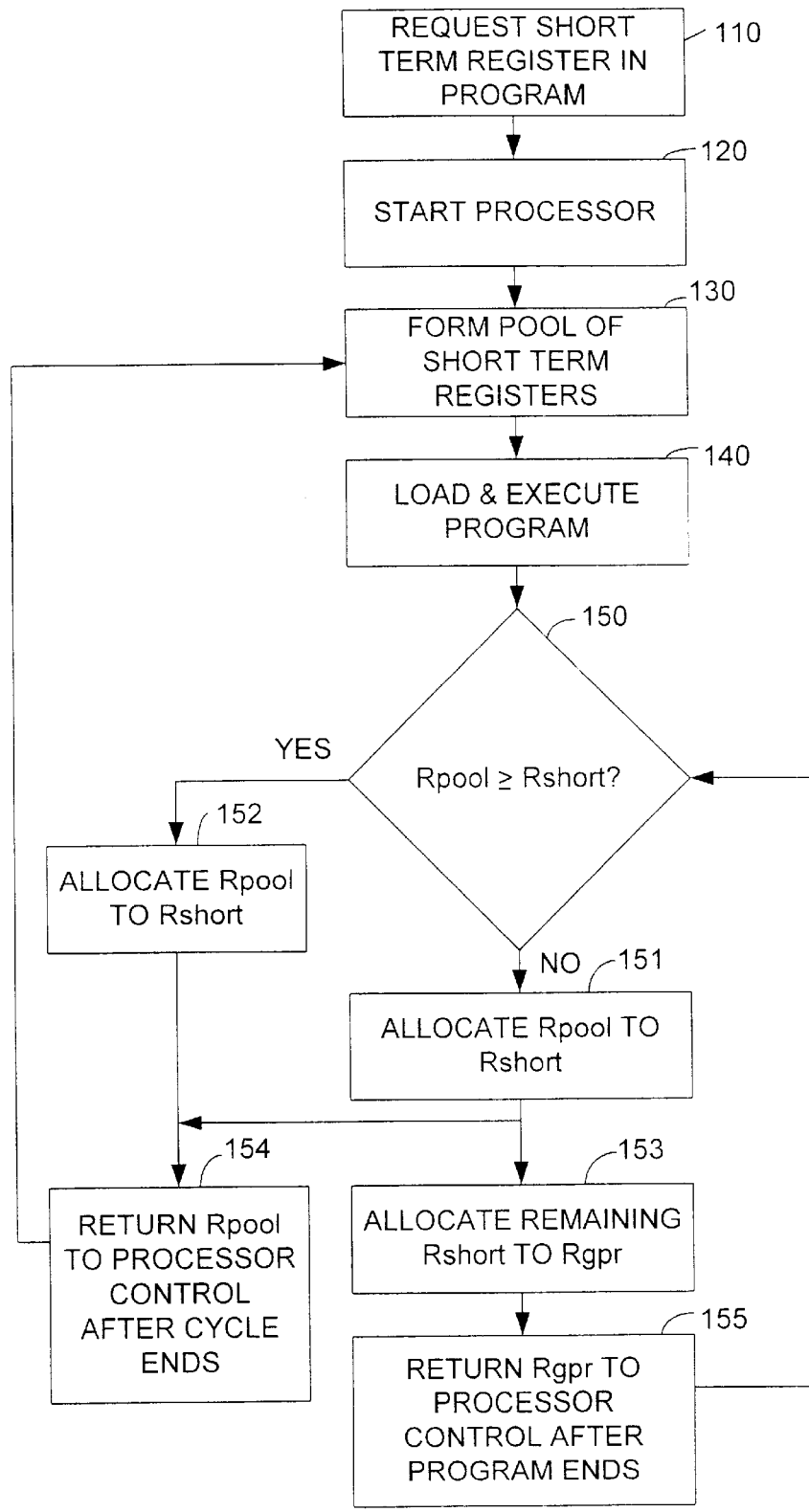
FIG. 1 illustrates a method for reducing memory storage during the program execution in which a pool of "short term" registers are used.

FIG. 1 illustrates a method for reducing memory storage during program execution in which a pool of "short term registers" and "long term registers" are used to store short term and long term data, respectively. In the context of the present invention, the terms "short term" and "long term" denote time periods relative to each other without defining absolute times themselves or differences therebetween. "Short term registers" and "long term registers" denote registers which, relative to each other, are controlled for a shorter or longer period of time, respectively.

Register control can be achieved through a variety of internal processor or external controls, but in the preferred embodiment is achieved responsive to one or more executing programs. In the preferred embodiment, the short term register is controlled for a period not longer than one sample period and the long term register is controlled for the entire program duration. Of course, shorter or longer control periods are possible for one of both of the short and long term registers. Data is preferably stored in the processor's general purpose registers (GPRs), although other processor registers may be used in alternative embodiments.

The method begins during the programming phase (step 110) when one or more registers in the virtual address space are earmarked as short term or long term registers. Data having a lifetime of one sample period or shorter is earmarked as such and addressed to a short term memory register defined in the program's address space. In the preferred embodiment, the term "TEMP GPR" is used to identify the register as a short term register, although any identifier may be used. Registers which do not have the identifier "TEMP GPR" are recognized by the processor as long term registers and addressed in the program's address space accordingly.

The program's address spaces now addresses to two different types of memory registers: long term registers and short term registers. The address space may be arranged in any order, although it is preferred that the first address spaces be allocated to the long term registers and the last address spaces assigned as short term registers. The desired address ordering can be arranged through the program's compiler.

Once the program is written and compiled, the processor is started (step 120). Upon startup (or alternatively before program execution begins), the processor allocates N of its registers to a pool of short term memory registers (step 120). The pooled short term registers are not dedicated to any one particular program, but are instead owned by the processor to provide any program with short term data storage for the short term processing period, one sample period in the preferred embodiment. The size of the pool (N) is determined by such factors as the expected number of simultaneously running programs, the average number of short term memory registers needed per program and the duration of the short term processing period. Other factors may include (but are not limited to) short term register usage history and the processor's total available memory space. N may be any number representing a portion of the processor's total memory and in one embodiment described in the commonly owned, copending patent application "Processor with Instruction Set for Audio Effects," N is between 10–16 registers. The remaining GPR registers are used to provide long term storage for a longer processing period, the program's duration in the preferred embodiment, except as provided below.

Subsequently at step 140, a program utilizing the short and long term registers is loaded. Next at step 150, a comparison is made between the number of requested short term registers ($R_{short}$) and the number of available pooled registers ($R_{pool}$). The number or available pooled registers may or may not be equal to N, depending upon if another simultaneously running program is currently using one or more of the pooled registers.

If there are a sufficient number of pooled registers ($R_{pool}>R_{short}$), the processor allocates the requested number of pooled registers to the program's short term register address space (step 152). The allocated pooled registers are then controlled by the program for the duration of the short term processing period, one sample period in the preferred embodiment. Upon expiration of the short term processing period, the processor regains control of the allocated registers for a possible subsequent re-allocation (step 154). A subsequent re-allocation may result from a request made by either the same program during a different sample period or from a different program. The processor additionally allocates from GPR memory the requested number of long term registers, which are controlled by the program for the duration of the program (not shown).

Alternatively, if there is not a sufficient number of pooled registers ($R_{pool}<R_{short}$), the processor will allocate the maximum number of pooled registers to the program's short term address space (step 151). As above, the allocated registers are then controlled by the program for one sample period. The processor will then allocate from the GPR memory the outstanding number of requested short term registers plus the requested number of long term registers (step 153). The allocated GPR registers will be controlled by the program for the duration of the program (step 155). Thus, in the instance where there are an insufficient number of short term registers are available (because only a small number were initially pooled or because of a heavy use period), a portion of the GPR registers are used to store short term data.

Table I illustrates three examples of the allocation process described above. In the example, $R_{long}$ refers to the number of requested long term registers, $R_{short}$ refers to the number of requested short term registers, $R_{pool}$ refers to the total number of pooled short term registers, and $R_{gpr}$ refers to the number of program-allocated long term GRP registers. In the examples, ten long term registers and five short term registers are requested.

TABLE I

|  | Program's Requested Registers | | Processor's Registers | |
| --- | --- | --- | --- | --- |
|  | $R_{long}$ | $R_{short}$ | $R_{pool}$ Avail | $R_{gpr}$ Used |
| Example #1 | 10 | 5 | 7 | 10 |
| Example #2 | 10 | 5 | 3 | 12 |
| Example #3 | 10 | 5 | 0 | 15 |

In the first example, seven pooled registers are available upon program execution. The processor identifies the running program as requesting five short term registers and ten long term registers. The processor recognizes that more pooled registers exist than requested, and therefore allocates the addresses of the requested number of pool registers to the program's short term register address space. The number of requested long term registers (10) is allocated from the GPR registers.

In the second example, a smaller number of short term registers (3) are available upon program request. The processor identifies the program as requesting five short term registers, two more than the pool can currently supply. To make up for the deficiency in the available number of short term registers, the processor allocates two long term GPR registers to the program's short term address space. Ten long term GPR registers are allocated to the program's long term address space. Thus, the total number of allocated long term GPR registers in this instance rises to twelve.

In the third example, no short term registers are available upon program execution. This is the case in conventional processing where no short term registers exist and where all data is stored in the long term GPR registers. It also represents the worst case simulation in the present method, for instance, during a heavy usage of the short term registers.

As can be seen from example 3, all of the required registers (15) are assigned from long tem GPR memory. In the present case where one-third of the requested registers are short term, the allocation of long term GPR memory is extremely inefficient. One-third of the registers allocated to the program are wasted until the program concludes. In comparison, the memory arrangement in example 1 requires fewer GPR registers, and those which are allocated to the program are assigned as long term registers to store long term data. The memory arrangement in example 2 conserves at least a portion of the GPR memory, assigning some of the requested short term registers to the pooled registers. Moreover, in both examples 1 and 2 the available pooled registers provides additional memory flexibility in that each is re-allocable to other short term registers during the same program time period compared to long term GPR registers which are not.

The described method may be expanded beyond the described short and long term registers. Using the techniques described above, an intermediate term register may also be implemented having an intermediate program control period relative to the short and longer term registers, for instance, 2 or 3 sample periods. By increasing the number of registers and associated control periods, additional programming flexibility can be attained and greater memory conservation achieved when processing data having three or more distinct lifetimes.

The described method may also be implemented in a multitude of different forms (i.e., software, hardware, or a combination of both) and in a variety of systems to process data having different lifetimes. In one embodiment, the described method can be implemented as a software program to process short and long term audio information in an audio signal processor. In an alternative embodiment, the method may be realized as a software program to store and process short and long term data in a computer system.

Figure 2:
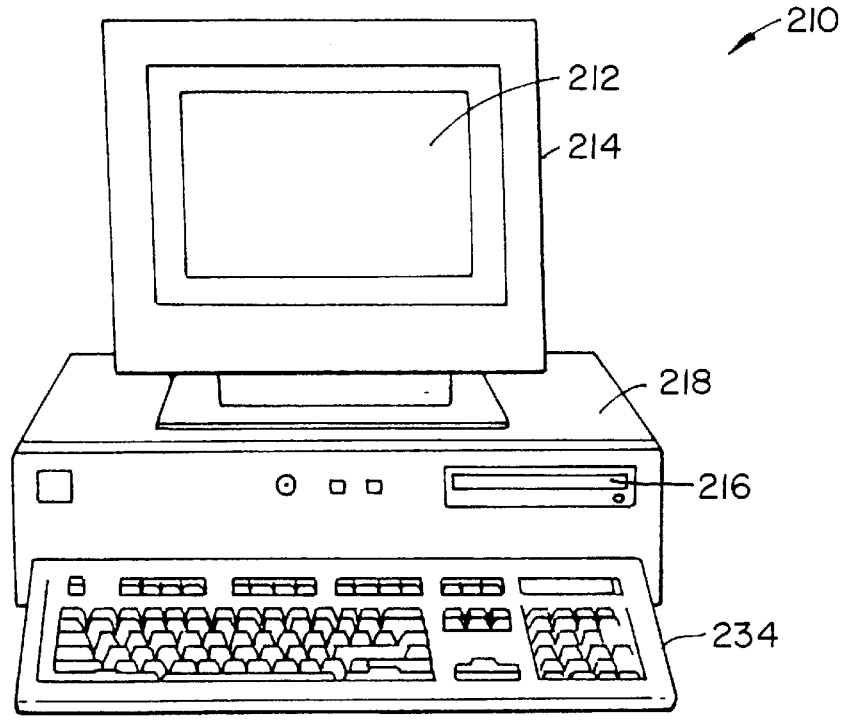
FIG. 2 illustrates an example of a computer system used to perform the method of the present invention.

FIG. 2 illustrates an example of a computer system 210 implementing the described method. Computer system 210 includes a monitor 214, screen 212, cabinet 218, and keyboard 234. A mouse (not shown) may also be included for providing additional input/output commands. Cabinet 218 houses a CD-ROM drive 216 or a hard drive (not shown) which may be utilized to store and retrieve digital data and software programs incorporating the present method, and the like. Although CD-ROM 216 is shown as the removable media, other removable tangible media including floppy disks, tape, and flash memory may be utilized. Cabinet 218 also houses familiar computer components (not shown) such as a processor, memory, and the like.

Figure 3:
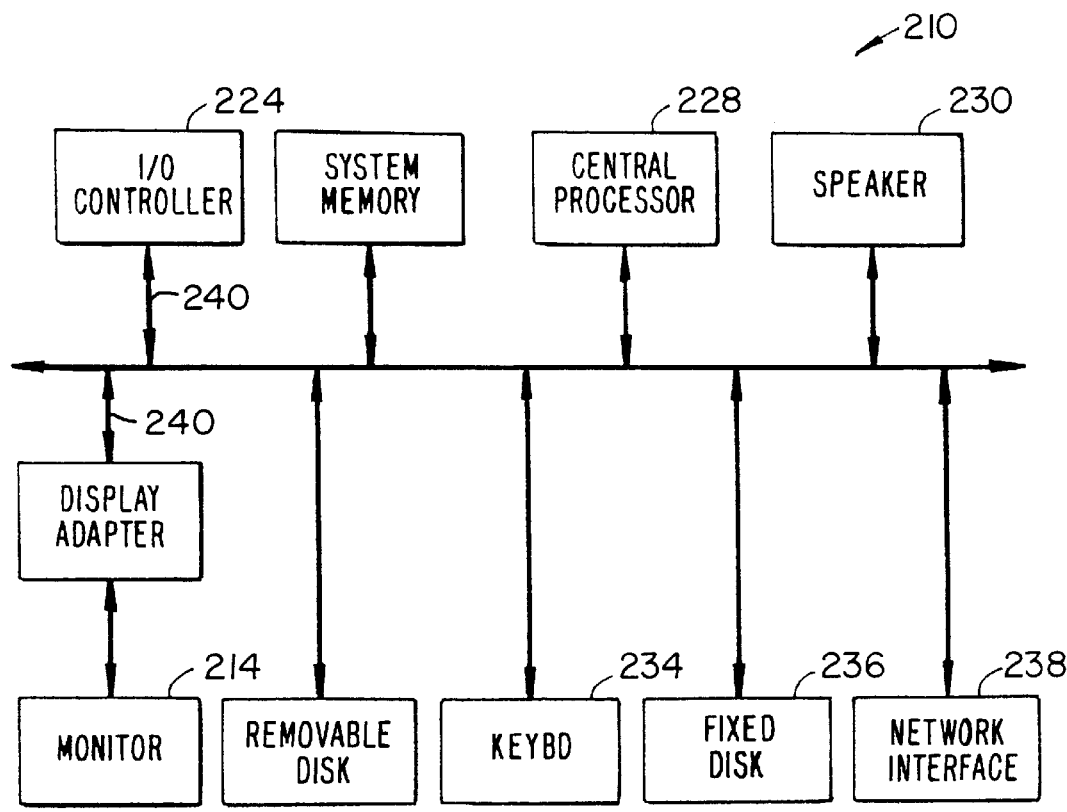
FIG. 3 illustrates a simplified system block diagram of a typical computer system used to perform the method of the present invention.

FIG. 3 illustrates a simplified system block diagram of a typical computer system 210 used to execute a software program incorporating the described method. As shown in FIG. 2, computer system 210 includes monitor 214. Computer system 210 further includes subsystems such as I/O controller 224, system memory 226, central processor 228, speaker 230, removable disk 232, keyboard 234, fixed disk 236, and network interface 238. Other computer systems suitable for use with the described method may include additional or fewer subsystems. For example, another computer system could include more than one processor 228 (i.e., a multi-processor system) for processing short or long term data responsive to the aforementioned data processing method. Arrows such as 240 represent the system bus architecture of computer system 210. However, these arrows 240 are illustrative of any interconnection scheme serving to link the subsystems. For example, a local bus could be utilized to connect the central processor 228 to the system memory 226. Computer system 210 shown in FIG. 3 is but an example of a computer system suitable for use with the present invention. Other configurations of subsystems suitable for use with the present invention will be readily apparent to one of ordinary skill in the art.

While the above is a complete description of one possible embodiment of the invention, various alternatives, modification and equivalents may be used. For instance, a person skilled in the art will appreciate that the foregoing description is not limited to the use of data having two different lifetimes. The objectives of the invention can also be accomplished by applying the described method to three or more registers to process data having three or more lifetimes. Nor is the invention limited to the processing of audio information. Those of ordinary skill in the art will appreciate that the invention is equally applicable to any form of data. Therefore, the above description should be viewed as only one embodiment of the present invention, the boundaries of which is appropriately defined by the metes and bounds of the following claims.

What is claimed is:

1. A method for conserving general purpose processor registers during the execution of a program in which short term data having a short processing period and long term data having a long processing period are processed, the method comprising the acts of:

providing a program comprising a first address space for addressing said short term data and a second address space for addressing long term data;

defining, within said processor, a first plurality of said general purpose registers as a set of pooled registers for storing said short term data;

executing said program;

allocating, responsive to a request from said program for a specified number of pooled registers, at least one of said pooled registers in the set to said first address space;

controlling, via said program, said at least one allocated pool register for the duration of said short processing period; and terminating program control of said at least one allocated pool register upon the expiration of said short processing period to return said at least one allocated pool register to the set so that said at least one allocated pool register can be re-allocated subsequent to the expiration of said short processing period.

2. The method of claim 1, the method further comprising the act of re-pooling said allocated pool register with said pooled registers.

3. The method of claim 2, wherein said act of allocating comprises the act of allocating, responsive to said program, all of said pool registers to said first address space of said program.

4. The method of claim 3, wherein said act of controlling comprises the acts of controlling, via said program, all of said allocated pool registers for said short processing period.

5. The method of claim 4, wherein said act of terminating comprising the act of terminating program control of all of said allocated pool registers upon the expiration of said short processing period.

6. The method of claim 5, wherein said act of re-pooling comprises the act of the re-pooling all of said allocated pool registers.

7. The method of claim 1, further comprises the act of defining within said processor a second plurality of registers comprising a long term register pool for storing said long term data.

8. The method of claim 7, wherein if said program's first address space requests a larger quantity of registers than is available in said pool of registers, said act of allocating further comprises the act of allocating the outstanding number of registers requested by said program's first address space to an equal number of registers within said long term register pool.

9. The method of claim 8, wherein said act of controlling further comprises the act of controlling, via said program for a duration of said long processing period, said equal number of registers within said long term register pool.

10. The method of claim 9, wherein said act of re-pooling further comprises the act of re-pooling said equal number of registers within said long term register pool in said long term register pool.

11. The method of claim 1, further comprising the acts of:

re-allocating, responsive to said program, said at least one of said pooled registers to said first address space;

controlling, via said program, said re-allocated processor register for said short processing period; and terminating program control of said re-allocated pool register upon the expiration of said short processing period;

wherein said acts of re-allocating, controlling said re-allocated register, and terminating program control of said re-allocated register occur within said long processing period.

12. A software product for controlling a processor having a plurality of general purpose memory registers during the execution of a program in which short term data having a short processing period and long term data having a long processing period are processed, the software product comprising:

a computer readable storage media comprising:

code that provides a program having a first address space for addressing short term data and a second address space for address long term data;

code that directs said processor to define a first plurality of said general purpose registers as a set of pooled registers for storing said short term data;

code that directs said processor to execute said program;

code that directs said processor to allocate, responsive to a request from said program for a specified number of pooled registers, at least one of said pooled registers in the set to said first address space;

code that directs said processor to control, via said program, said at least one allocated pool register for the duration of said short processing period; and code that directs said processor to terminate program control of said at least one allocated pool register upon the expiration of said short processing period to return said at least one allocated pool register to the set so that at said least one allocated pool register can be re-allocated subsequent to the expiration of said short processing period.

13. The software product of claim 12, wherein said computer readable storage media further comprises code that direct said processor to re-pool said allocated pool register with said pooled registers.

14. The software product of claim 13, wherein said computer readable storage media further comprises code that directs said processor to define within said processor a second plurality of registers comprising a long term register pool for storing said long term data.

15. The software product of claim 14, wherein, if said program's first address space requests a larger quantity of registers than is available in said pool of registers, said computer readable storage media further comprises code that directs said processor to allocating the outstanding number of registers requested by said program's first address space to an equal number of registers within said long term register pool.

16. The software product of claim 15, wherein said code that directs said processor to control further comprises code that directs said processor to control said second plurality of registers for the duration of said long processing period.

17. In an audio signal processor for processing audio information, the audio signal processor having general purpose memory registers for storing short term audio data having a short processing period and long term audio data having a long processing period, a method for conserving processor registers comprising the acts of:

providing a program comprising a first address space for addressing said short term data and a second address space for addressing long term data;

defining, within said processor, a first plurality of said general purpose registers as a set of pooled registers for storing said short term data;

executing said program;

allocating, responsive to a request from said program for a specified number of pooled registers, at least one of said pooled registers to said first address space;

controlling, via said program, said at least one allocated pool register for the duration of said short processing period;

terminating program control of said at least one allocated pool register upon the expiration of said short processing period; and re-pooling said allocated pool register with said pooled registers to return said at least one allocated pool register to the set so that at said least one allocated pool register can be re-allocated subsequent to the expiration of said short processing period.

\* \* \* \* \*